No. 786,918. PATENTED APR. 11, 1905.
H. PECHEUR.
CONTINUOUS CURRENT ELECTRIC MOTOR.
APPLICATION FILED JAN. 6, 1905.

Witnesses

Inventor
Henri Pecheur
ATTORNEYS

No. 786,918.

Patented April 11, 1905.

UNITED STATES PATENT OFFICE.

HENRI PECHEUR, OF PARIS, FRANCE, ASSIGNOR TO SOCIÉTÉ ANONYME POUR LE TRAVAIL ELECTRIQUE DES METAUX, OF PARIS, FRANCE.

CONTINUOUS-CURRENT ELECTRIC MOTOR.

SPECIFICATION forming part of Letters Patent No. 786,918, dated April 11, 1905.

Application filed January 6, 1905. Serial No. 239,915.

*To all whom it may concern:*

Be it known that I, HENRI PECHEUR, a citizen of France, residing at Paris, in the said Republic of France, have invented new and useful Improvements in Continuous-Current Electric Motors, (for which I have obtained a Patent in France, No. 343,053, May 10, 1904; in Germany, No. 157,885, May 14, 1904, and in Hungary, August 6, 1904, without number,) of which the following is a specification.

This invention relates to a construction of continuous-current electric motor wherein for a given power the weight and diameter of the machine are comparatively small. For this purpose the shaft of the armature is extended in each axial direction, so as to carry a field-winding situated one beyond each end of the armature. The pole-pieces may be of any number and are arranged parallel to the shaft in such a manner that alternate pieces are of opposite polarity and that they are symmetrical in pairs relatively to the shaft.

In the accompanying drawings is shown, by way of example, a four-pole motor made according to the invention.

Figure 1:
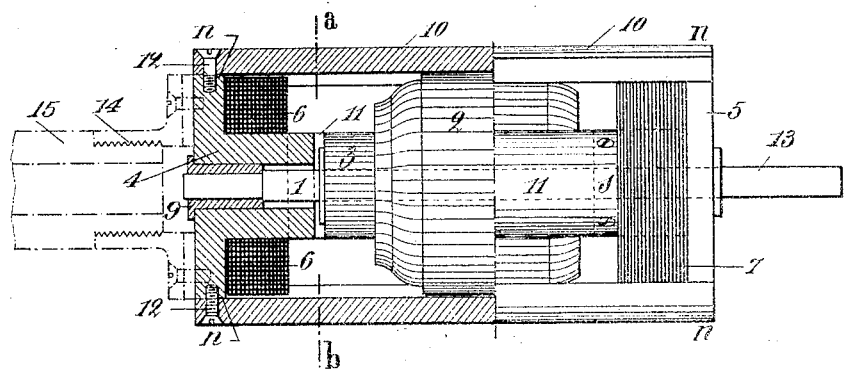
Figure 2:
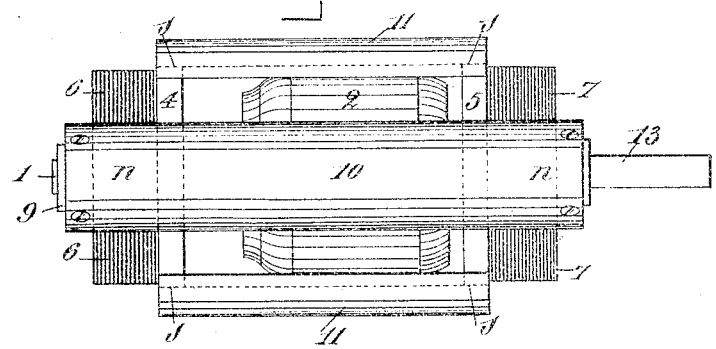
Figure 3:
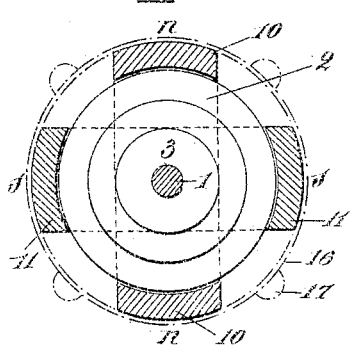
Figure 4:
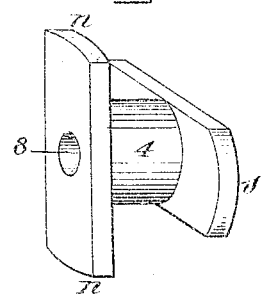

Figure 1 shows the motor half in elevation and half in section. Fig. 2 is a plan. Fig. 3 is a cross-section on line $ab$ of Fig. 1. Fig. 4 is a perspective view of one of the cores carrying the field-winding.

The soft-iron plates of the armature 2 are assembled on the shaft 1 in the usual manner, and the armature-winding is of any known type. The sections of the winding are respectively connected with corresponding laminæ of the commutator 3 in the usual manner, the latter being keyed to the shaft. The supply of current to the commutator is through any suitable brushes. (Not shown in the drawings.)

The shaft 1 passes at each end through a core of soft iron 4 and 5, respectively, which carries the field-winding 6 and 7, respectively, the latter being supplied by current according to any known system. In the central perforation 8 of each of these cores is inserted a bush 9, forming a bearing for the shaft. At each end the core is extended laterally, as at $n$ and $s$, these polar extensions being designed to carry the pole-pieces 10 and 11, which are soft-iron shells fixed to the said extensions by metal screws, such as 12, and thus covering the armature longitudinally and in part peripherally. The necessary current-leads pass between the pole-pieces. One end of shaft 1 is prolonged outside the motor, as at 13, so that it may be coupled with the shaft or the like which is to be driven.

The motor has the advantage of being very rigid and of having its parts economically and perfectly centered. Loss of magnetic flux through shaft 1 cannot occur if the polarity of the pole-pieces is such that either two north poles $n$ or two south poles $s$ are always in view parallel to the shaft.

The motor is specially applicable where lightness and small dimensions are desirable—for instance, for motor road-vehicles or for driving the scouring-wheels of devices for cleaning tubular boilers. In the latter case the collar carrying the wheels is keyed to the end 13 of the shaft, and on the other end of the motor, as shown in dotted lines in Fig. 1, is fixed a screw-socket 14 to receive the end of a hollow rod 15 of any desired length through which the electric leads pass. In this case it is of advantage to incase the motor in a cover 16, (shown in dotted lines in Fig. 3,) having projections 17 for guiding the motor in the boiler-tubes.

Having thus described the nature of my said invention and the best means I know of carrying the same into practical effect, I claim—

A continuous-current electric motor comprising an armature, an armature-shaft, a commutator keyed to the said shaft, two cores on the said shaft one beyond each end of the armature, a field-winding on each of the said cores, a number of equally-spaced polar extensions to each of the said cores, such that consecutive extensions are of opposite polarity, pole-pieces extending from each polar extension of one core to the corresponding polar extension of the other core, the said polar extensions being so arranged relatively to the shaft that parallel to the latter there are always in view two pole-pieces of the same polarity extending over the armature in the direction of its length.

In testimony whereof I have signed my name to this specification in the presence of two subscribing witnesses.

HENRI PECHEUR.

Witnesses:
 JULES FAYOLLET,
 EUGÉNE PICHON.